(12) United States Patent
Kotelly et al.

(10) Patent No.: US 7,787,611 B1
(45) Date of Patent: Aug. 31, 2010

(54) PACKET TELEPHONY BRIDGING SERVER

(75) Inventors: James A. Kotelly, Pepperell, MA (US); Steven Chervets, N. Andover, MA (US); John C. Orlowski, Lowell, MA (US)

(73) Assignee: Cisco Technology, Inc., San Jose, CA (US)

( * ) Notice: Subject to any disclaimer, the term of this patent is extended or adjusted under 35 U.S.C. 154(b) by 1259 days.

(21) Appl. No.: 10/944,267

(22) Filed: Sep. 17, 2004

(51) Int. Cl.
*H04M 3/00* (2006.01)
(52) U.S. Cl. .............................. 379/265.11; 379/265.01
(58) Field of Classification Search ............ 379/265.11, 379/189, 218, 265.1
See application file for complete search history.

(56) References Cited

U.S. PATENT DOCUMENTS

| 5,712,954 | A | | 1/1998 | Dezonno | 395/2.34 |
| 5,737,405 | A | | 4/1998 | Dezonno | 379/265 |
| 5,790,635 | A | | 8/1998 | Dezonno | 379/34 |
| 6,563,814 | B2 | * | 5/2003 | Rowan et al. | 370/352 |
| 6,954,794 | B2 | * | 10/2005 | Rudd et al. | 709/230 |
| 7,230,946 | B2 | * | 6/2007 | Schoeneberger | 370/352 |
| 7,385,621 | B2 | * | 6/2008 | Parker et al. | 348/14.08 |

OTHER PUBLICATIONS

Avaya—Support—What is Home Agent? Document Preview, http://support.avaya.com/japple/css/japple?temp.groundID=107528 &temp.selectedFamily=, Nov. 5, 2004.

Telephony World.com, Aspect UNIPHI Connect Wins 'Best of Show' at International Call Center Management Expo, Aug. 23, 2004, Posted by—Telephony World@ 9:51 pm PST, http://www.telephonyworld.com/cgi-bin/news/viewnews.cgi?category=all &id=1093312294.

* cited by examiner

*Primary Examiner*—Curtis Kuntz
*Assistant Examiner*—Amal Zenati
(74) *Attorney, Agent, or Firm*—Tucker Ellis & West LLP (57) ABSTRACT

A bridging server instantiates virtual packet telephones that emulate physical packet telephone instruments, and includes a switch operative to establish connections between respective pairs of the virtual packet telephones. A first one of a pair of virtual packet telephones is operative to receive an incoming packet telephone call on behalf of a circuit telephone for which an incoming packet telephone call is destined. A controller in the bridging server establishes, via a gateway device, a first connection between the circuit telephone and a second one of the pair of virtual packet telephones, and in response to the incoming packet telephone call establishes control inputs of the switch to establish an internal bridging connection between the first and second virtual packet telephones, thus completing the end-to-end connection. From the perspective of other packet telephony equipment, the bridging server effectively hides the connection to the circuit telephone. The bridging server can be used in applications such as call centers and CENTREX systems.

22 Claims, 8 Drawing Sheets

PACKET TELEPHONY BRIDGING SERVER

BACKGROUND

The present invention is related to the field of packet telephony.

In the field of voice communications, there is increased use of packet telephony, also referred to as "voice over IP" or VOIP, as opposed to traditional circuit-based telephony. In packet-based telephony, the samples of periods of speech (or silence) of a telephone call are organized into discrete packets that are transmitted among the parties involved in the call. The packets are sent successively through a packet network such as the Internet. In contrast to circuit-based telephony, there is no reserved circuit, or end-to-end path, along which the packets can travel unimpeded. Rather, the telephony packets are treated in many respects as regular data packets that are carried as part of non-telephony applications, such as file transfer and electronic mail. This transmission method provides certain challenges in providing a desirable quality of service, including the need to smooth out the inherent variable delays of packet transmission so that the content of the call can be faithfully reproduced at the receiving end. However, packet-based telephony can generally be provided at significantly less expense than traditional circuit-based telephony, and also is more amenable to being integrated with computer applications to form new and valuable services, and therefore the use of packet telephony is expected to continue to expand.

One important aspect of packet telephony is its interface to traditional circuit telephony systems, such as the public switched telephone network (PSTN). Circuit telephony is still ubiquitous and will likely continue to be predominant in the foreseeable future. Specialized devices called "gateways" have been developed that are placed at the interface between packet telephony systems and circuit telephony systems. Gateways convert, in real time, between the time-multiplexed and pulse-coded format of a circuit telephone signal, on the one hand, and the packetized format required in a packet telephony system on the other, thus enabling a subscriber in one system to engage in a telephone call with a subscriber in the other system.

One area in which packet telephony has been deployed is in call centers, which are facilities that handle incoming calls from a particular population. Call centers are widely used by large companies, for example, in providing customer support. Some call centers can be quite large, and thus the favorable economies of packet telephony make it an attractive implementation option. Another benefit is the relative ease with which packet telephone connections can be integrated with software programs. Operators or "agents" within a call center typically have a computer terminal with access to company databases that contain information necessary to satisfy customer calls. The routing and other manipulation of a packet call can easily be integrated with the database access and other programs utilized within the call center.

SUMMARY

There is a need in call centers and other types of systems to provide the services of a packet telephony system in connection with users of traditional circuit telephones. In the call center application, for example, it can be desirable to enable call center agents to use circuit telephones so that the agents can perform their jobs from home or other off-site locations at which only circuit telephony services are offered. In some cases the quality of the voice signals may be superior when circuit telephony is used, and thus it may be preferred that call center agents utilize circuit telephones. In other applications, it may be desirable to provide other kinds of services from a packet telephony environment to users of circuit phones. Additionally, it may be desired to provide such services while requiring little or no modification of existing packet telephony systems in which such services are already provided to users of packet telephones. Specific examples of such applications are given herein below.

To address these needs in modern telephone communications, there is disclosed a bridging server for providing packet telephony connections. The bridging server is capable of instantiating many "virtual" packet telephones, each being a software process that emulates a "hard" packet telephone (i.e., a physical packet telephone instrument). Each virtual packet telephone is coupled to a corresponding interface of the bridging server. For a given call to be handled by the bridging server, a first one of a pair of virtual packet telephones is operative to receive an incoming packet telephone call on behalf of a circuit telephone for which the incoming packet telephone call is actually destined. In the case of a call center application, for example, the first virtual packet telephone acts on behalf of the circuit telephone of a call center agent. This proxy relationship is established during initialization of the bridging server.

The bridging server further includes a switch operative in response to control inputs to establish connections between respective pairs of the virtual packet telephones. A controller is operative to (1) establish, via a gateway device, a first connection between the circuit telephone and a second one of the pair of virtual packet telephones, and (2) in response to the incoming packet telephone call, establish the control inputs of the switch so as to establish an internal bridging connection between the first and second virtual packet telephones, thus completing the end-to-end connection for the call.

Through the use of the pairs of virtual packet telephones, the bridging server simplifies the interfacing of packet telephony equipment to traditional circuit telephones. From the perspective of a call center controller device, for example, an incoming customer call has simply been routed to a packet telephone associated with an agent, just as in the usual case of an agent using a hard packet phone. The bridging server is independently responsible for the connection to the circuit telephone, which is effectively hidden from the rest of the packet telephony system. This makes it relatively easy to adapt existing packet telephony applications for use with circuit telephones. In another disclosed application, a packet telephony system employing a bridging server provides private centralized exchange telephony services, commonly referred to as CENTREX services, to users of circuit telephones. Such a system can provide various features, normally available only to users of hard packet phones, to users of traditional circuit telephones.

BRIEF DESCRIPTION OF THE SEVERAL VIEWS OF THE DRAWING

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION

Figure 1:
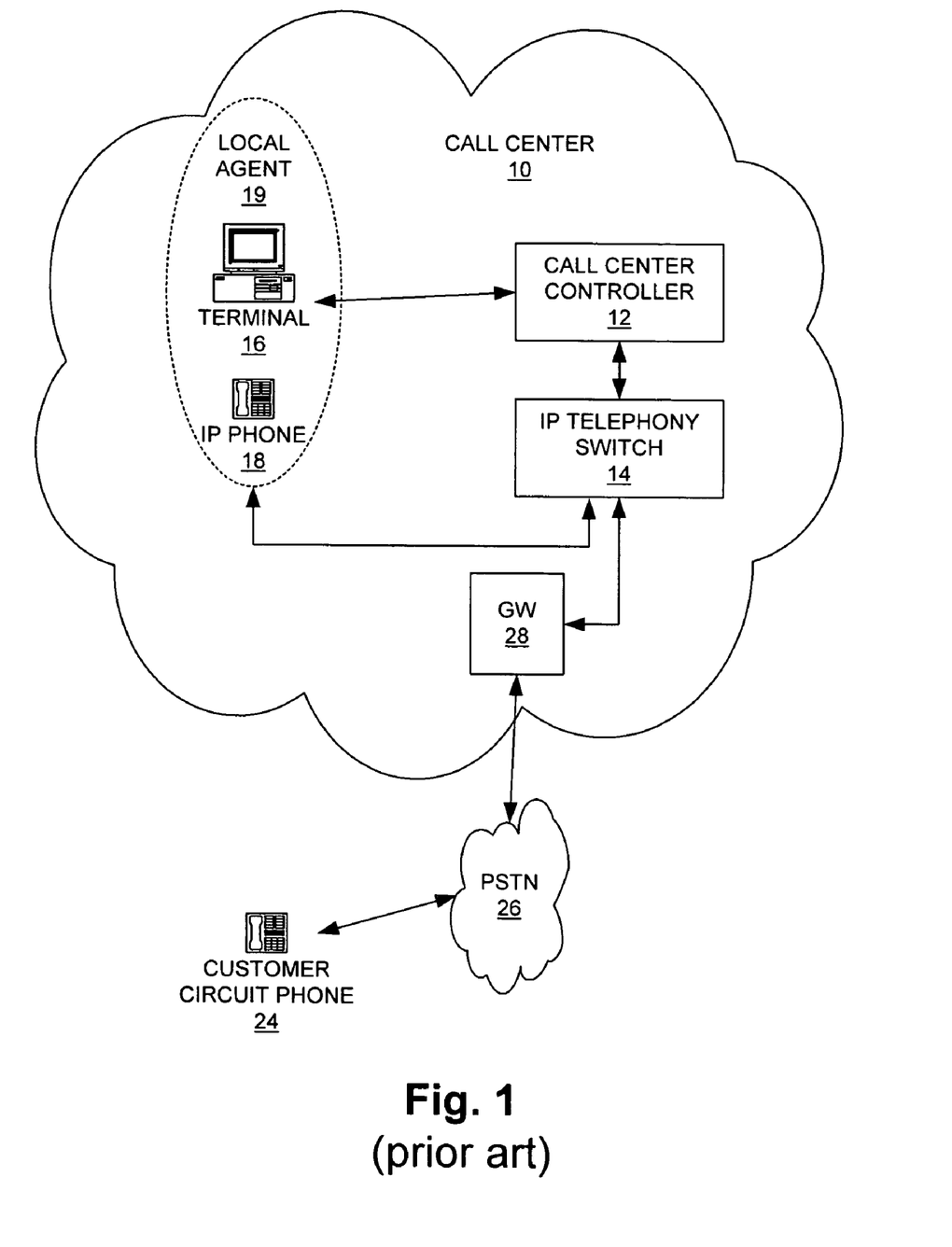
FIG. 1 is a block diagram of a call center system employing packet telephony as known in the art.

FIG. 1 shows a configuration for call center services as known in the art. An IP-based or packet-based call center 10 includes a call center controller 12 (which is essentially a so-called "automatic call distributor" or ACD) and a packet telephony switch shown as an Internet Protocol (IP) telephony switch 14. A computer terminal 16 and an IP telephone 18 of a "local" call center agent 19 are shown. It will be appreciated that in general, a call center includes a large number of agents that handle incoming customer calls, but for present purposes it is sufficient to show only one such agent. The agent 19 is known as "local" because the terminal 16 and IP phone 18 are coupled directly to the call center controller 12 and IP telephony switch 14. It will be appreciated that in most instances a number of local agents are located together in a single call center facility.

A customer using a conventional "plain old telephone service" (POTS) telephone, shown as circuit telephone 24, is coupled to the call center 10 via the public switched telephone network (PSTN) 26 and a gateway 28 within the call center 10. The gateway 28 is a conventional device that converts between the circuit-based operation of the PSTN 26 and the packet-based telephony operation of the call center 10.

During operation of the prior art system of FIG. 1, the local agent logs in to the call center controller 12 using a so-called "computer-telephony integration" or CTI application, which associates the agent's terminal 16 with the agent's IP phone 18. When the call center controller 12 receives a customer call and selects the agent to handle the call, it notifies the agent via the terminal 16 and routes the call to the IP phone 18. The agent engages in the telephone call with the customer, and generally utilizes the terminal 16 to obtain pertinent information such as customer identification information, order status information, etc. Once the telephone call is terminated, this fact is signaled to the call center controller 12 which then adds the agent 19 to a list of agents available to handle subsequent calls.

One of the desirable aspects of the system of FIG. 1 is the use of packet (IP) telephony within the call center 10. The IP phones 18 are identified by respective IP addresses, and are easily associated with terminals 16 that also are identified by IP addresses. Calls can be conferenced or re-routed easily by providing appropriate controls to the IP telephony switch 14. From the perspective of the call center controller 12, incoming customer calls are routed to IP addresses (IP phones) of local agents 19 that are known to be ready to accept such calls.

Figure 2:
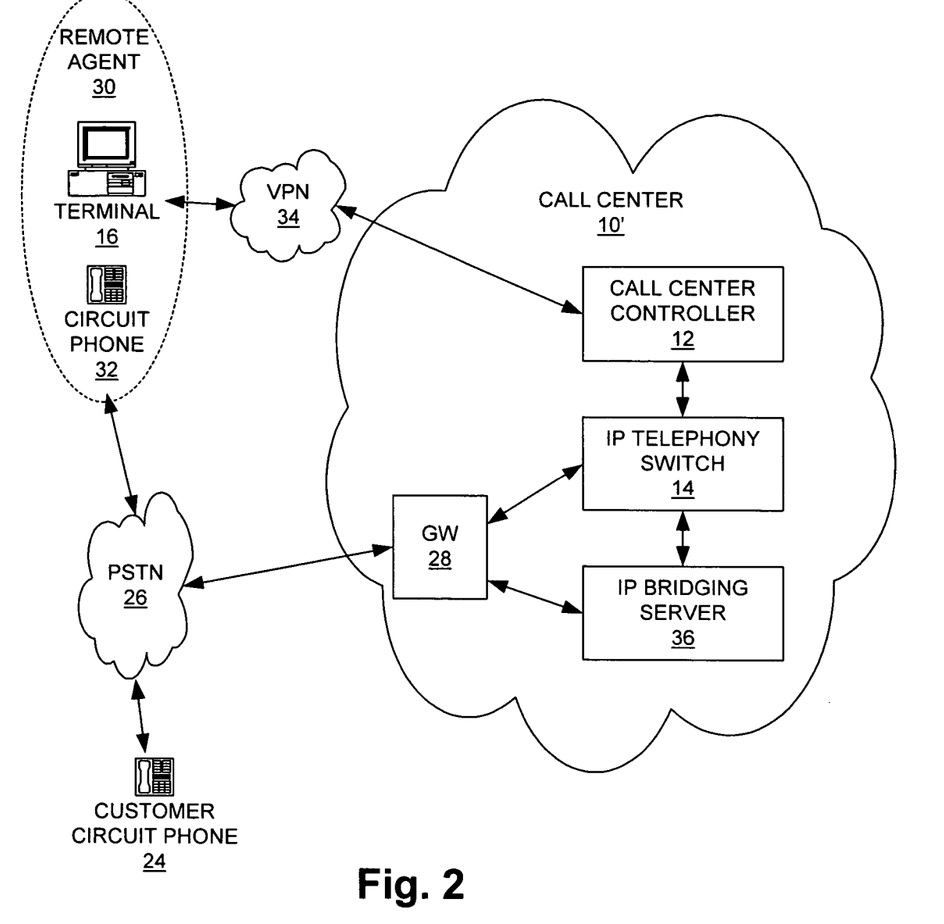
FIG. 2 is a block diagram of a call center system including a packet bridging server in accordance with the present invention.

FIG. 2 shows a call center arrangement in accordance with the present invention. A call center 10' is configured to route incoming customer calls to "remote" agents 30, in particular to an agent 30 that employs a traditional circuit-based telephone 32 coupled to the PSTN 26. Such an agent 30 may be located at his/her home, for example, rather than at a call center facility as in the system of FIG. 1. This modified arrangement thus enables agents to "telecommute", with the telephone connection being made via the PSTN 26 and the CTI connection being made via a virtual private network (VPN) 34. The call center 10' includes an IP bridging server 36 having connections to the IP telephony switch 14 via which the gateway 28 is reached.

Figure 3:
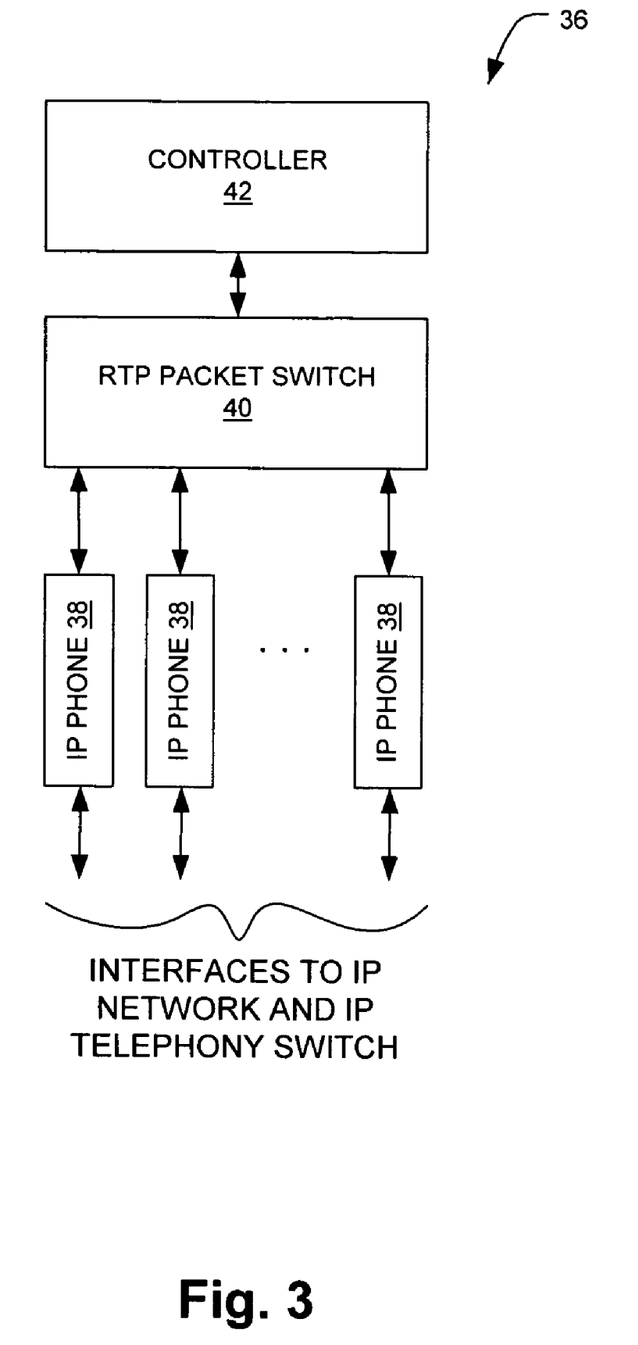
FIG. 3 is a block diagram of the bridging server of FIG. 2.

FIG. 3 shows the internal arrangement of the IP bridging server 36, which can be implemented for example using a standard server-type computer platform running a commercial operating system such as the Windows® operating system sold by Microsoft Corp. The IP bridging server 36 includes a plurality of emulated or "virtual" IP telephones ("IP phones") 38 that are instantiated during initial operation of the IP bridging server 36. The IP phones 38 are independent software processes executing within the IP bridging server 36, each implementing at least the basic functionality associated with a conventional "hard" (i.e., physical) IP phone, including of course the ability to initiate and receive IP telephone calls using known IP telephony protocols. The IP phones 38 are logically connected to respective external interfaces that connect the IP bridging server 36 with the IP telephony switch 14 of FIG. 2. Each of the IP phones 38 is assigned a unique identifier by which it can be addressed from outside the IP bridging server 36. In one embodiment, each IP phone 38 has a unique port number that can be used in conjunction with a pre-assigned IP address shared by all the IP phones 38. Other identification schemes, including the use of unique IP addresses, are possible.

The IP bridging server 36 further includes one or more software processes that collectively implement a real-time protocol (RTP) packet switch 40. During operation, "connections" are established between respective pairs of the IP phones 38. These connections take the form of packet transfers by the RTP packet switch 40. That is, when a connection between two IP phones 38 has been established, the RTP packet switch 40 is responsible for forwarding RTP packets received at one of the IP phones 38 of the pair to the other IP phone 38 of the pair, and vice-versa. Thus, the RTP packet switch 40 can also be thought of as a packet relay mechanism.

The IP bridging server 36 further includes a controller 42 that is responsible for various control aspects of operation, including for example instantiating the virtual IP phones 38 and interacting with the call center controller 12 (FIG. 2) with respect to the assignment of port numbers to the IP phones 38 and their association with remote circuit phones, as described in more detail below. It will be appreciated that the controller 42 may communicate with the external world via a separate IP data interface not shown in FIG. 3.

The operation of the call center arrangement of FIG. 2 is now described with reference to the flow diagram of FIG. 4 and the annotated block diagram of FIG. 5.

Figure 4:
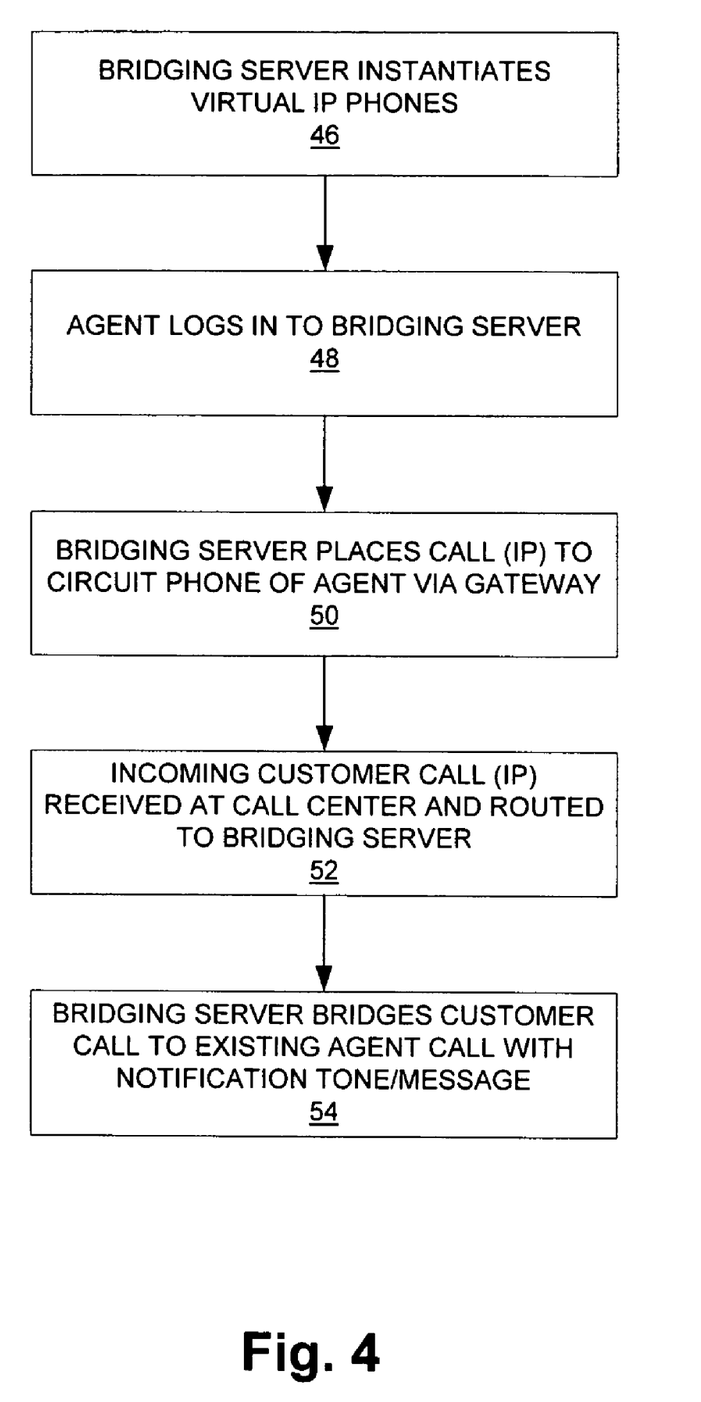
FIG. 4 is a flow diagram of the manner of operation of the call center of FIG. 2.
Figure 5:
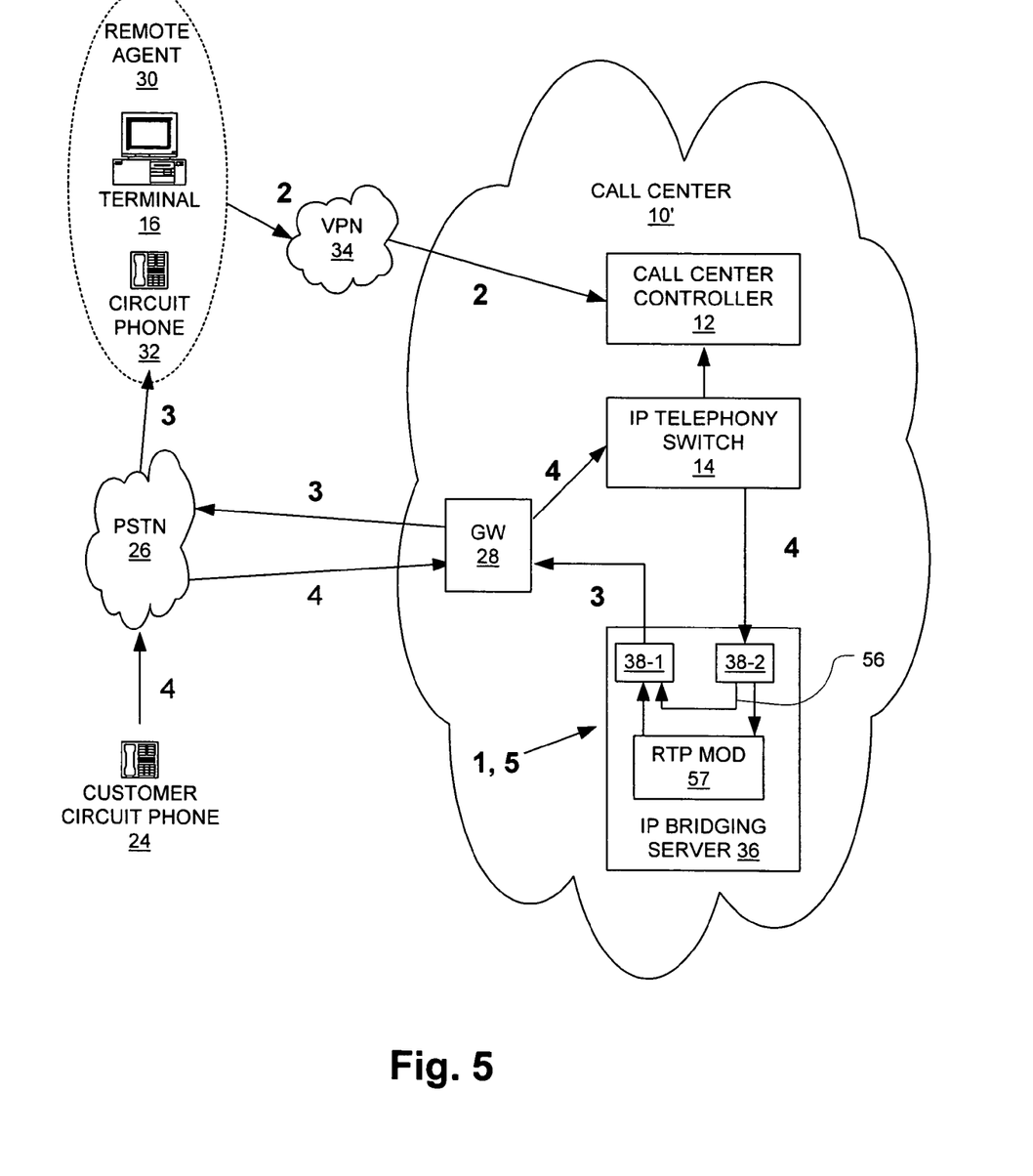
FIG. 5 is a block diagram of the call center system of FIG. 2 with descriptive annotations corresponding to the steps of the process of FIG. 4.

As shown at step 46 of FIG. 4 and indicated with a "1" in FIG. 5, the bridging server 36 initially instantiates a number of virtual IP phones 38. In FIG. 5, two of these phones 38-1 and 38-2 are shown. Each of these phones has an associated port number as described above.

At step 48 of FIG. 4 and indicated by "2" in FIG. 5, the remote agent 30 logs in via the VPN 34 to indicate his/her availability to accept calls. As part of the login, the remote agent 30 is associated within the call controller 12 with the IP address of an IP phone. This operation is essentially the same as that of the prior art system of FIG. 1, except in that case the IP address is that of the IP phone 18 used by a local agent 19. In the system of FIGS. 2 and 5, the address is that of the bridging server 36 with an appended port number of one of the virtual IP phones 38, specifically that of the phone 38-2 shown in FIG. 5. This address will have been previously configured.

As shown at step 50 of FIG. 4 and indicated as "3" in FIG. 5, the bridging server 36 responds to the agent's login by placing a call to the agent's circuit phone 32 via the gateway 28 and PSTN 26. This call is placed from the virtual IP phone 38-1. Once the agent answers the call, the call can be kept open for the duration of the agent's working session, which generally involves numerous individual calls.

As shown at step 52 of FIG. 4 and indicated as "4" in FIG. 5, a customer then places a call to the call center 10', in this case from a circuit phone 24 via the PSTN 26 and gateway 28. In the same fashion as in the prior art system of FIG. 1, the call center controller 12 routes the call to the IP address of the IP phone of an agent selected to handle the call. In the case of the system of FIGS. 2 and 5, however, this IP address is that of the virtual IP phone 38-2 within the bridging server. Because the path to the actual agent phone 32 is via the virtual IP phone 38-2, the virtual IP phone 38-2 can be viewed as a "proxy" for the agent phone 32. From the perspective of the call center controller 12, it is as though the agent is a local agent using a hard IP phone having the same address as the virtual IP phone 38-2. In this respect, the bridging server 36 enables expanded functionality (e.g., support for remote agents) while retaining backwards compatibility with existing call center equipment, which can make adoption of the new functionality easier for vendors and customers alike.

As shown at step 54 and indicated as "5" in FIG. 5, the bridging server 36 responds to the incoming customer call at virtual IP phone 38-2 by "bridging" the two phones 38-1 and 38-2 together, i.e., establishing a connection for relaying the RTP packets carrying the call media from each phone to the other, thus completing a circuit between the customer circuit phone 24 and the agent circuit phone 32. This bridging, which is represented by a line segment 56 in FIG. 5, is implemented via the RTP packet switch 40 shown in FIG. 3 as configured by the controller 42 (also shown in FIG. 3).

During the very initial part of the call, the bridging server 36 provides a notification to the agent 30 that he/she is receiving a new customer call. This notification may take the form, for example, of a pre-recorded message or a tone played out to the agent's phone 32. The notification may also include information identifying the customer to the agent, which may have been obtained, for example, from records within the call center 10' based on the telephone number of the calling party. For the purpose of this notification, the IP bridging server 36 includes a function RTP MOD 57 (FIG. 5) that modifies a small number of the RTP packets being relayed to the agent 30 during the initial part of the call to insert the message or tone. This has the effect of substituting the notification for whatever sounds are coming from the customer end. However, given that the call is just being established and the agent has not yet spoken to the customer, the customer will typically be silent (or at least not directing speech to the agent), and thus the loss of any information in the initial part of the call to the agent is likely of no consequence.

As an alternative to the above operation, the bridging server may place a call to the agent 30 from the virtual IP phone 38-1 upon receiving each incoming customer call, rather than doing so upon the agent's logging in and maintaining the agent call for multiple customer calls. In this case, it may be unnecessary to overwrite the initial RTP stream as described above, because the agent will be notified by the new call.

As another alternative, the bridging server 36 may be capable of accepting the agent's log-in over a telephone connection, using a program for interpreting the dual-tone multiple-frequency (DTMF) tones generated by a circuit telephone. In this case, the agent 30 logs in by calling the bridging server 36 and then executing the log-in procedure.

Figure 6:
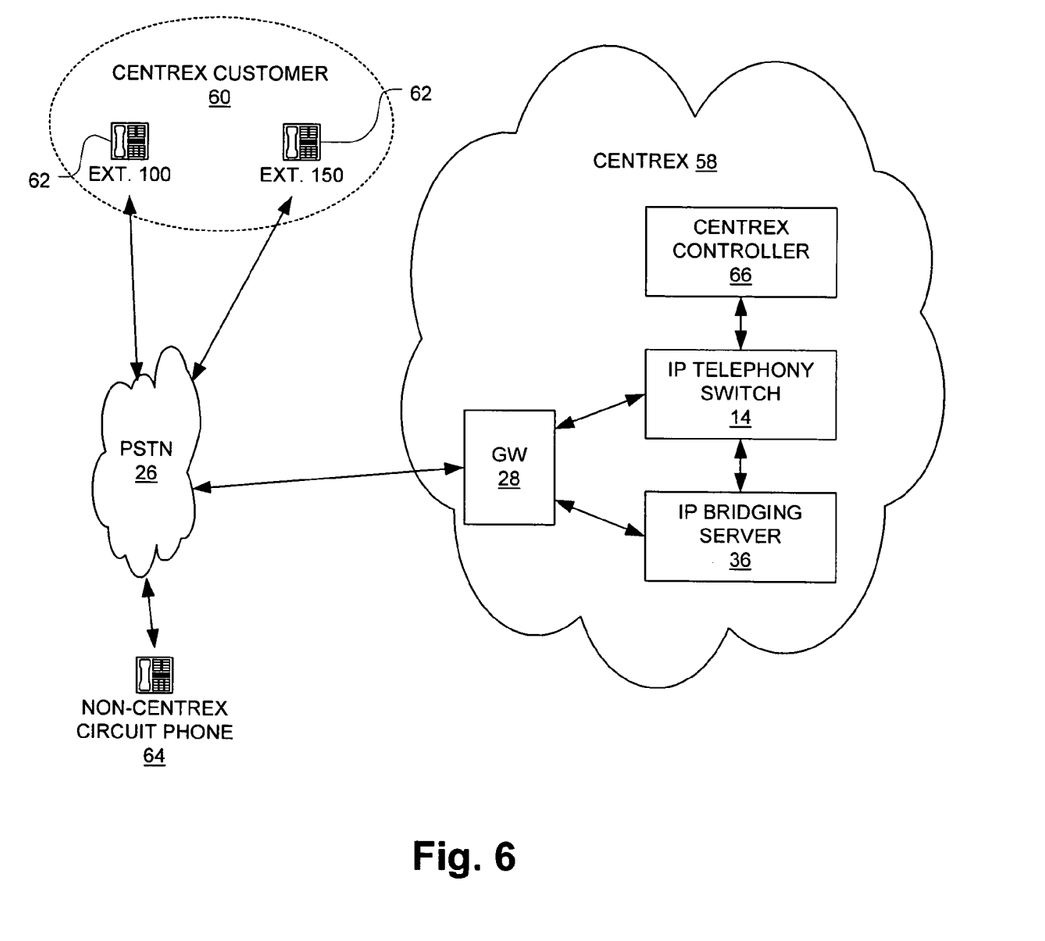
FIG. 6 is a block diagram of a centralized private exchange (CENTREX) system also including a packet bridging server in accordance with the present invention.

FIG. 6 shows another application of the bridging server 36. In this application, the bridging server 36 is part of a centralized private exchange (CENTREX) system 58 providing quasi-private telephone switching services to a CENTREX customer 60. The overall topology of the CENTREX application of FIG. 6 is similar to that of the call center application of FIG. 2. As shown, the CENTREX customer 60 includes multiple circuit telephones or extensions 62, two of these being shown as extension 100 and extension 150. The CENTREX system 58 includes interfaces via which connections to telephones outside the system can be made, such as to the non-CENTREX circuit phone 64. A CENTREX controller 66 controls the operation of the CENTREX system 58.

The operation of the CENTREX system 58 is now described with reference to FIGS. 7 and 8 for a particular operational scenario. In this scenario, a call is placed from the non-CENTREX phone 64 to extension 100 of the CENTREX customer 60. After awhile, it is desired to conference in the person at extension 150, after which the call continues until it is terminated.

Figure 7:
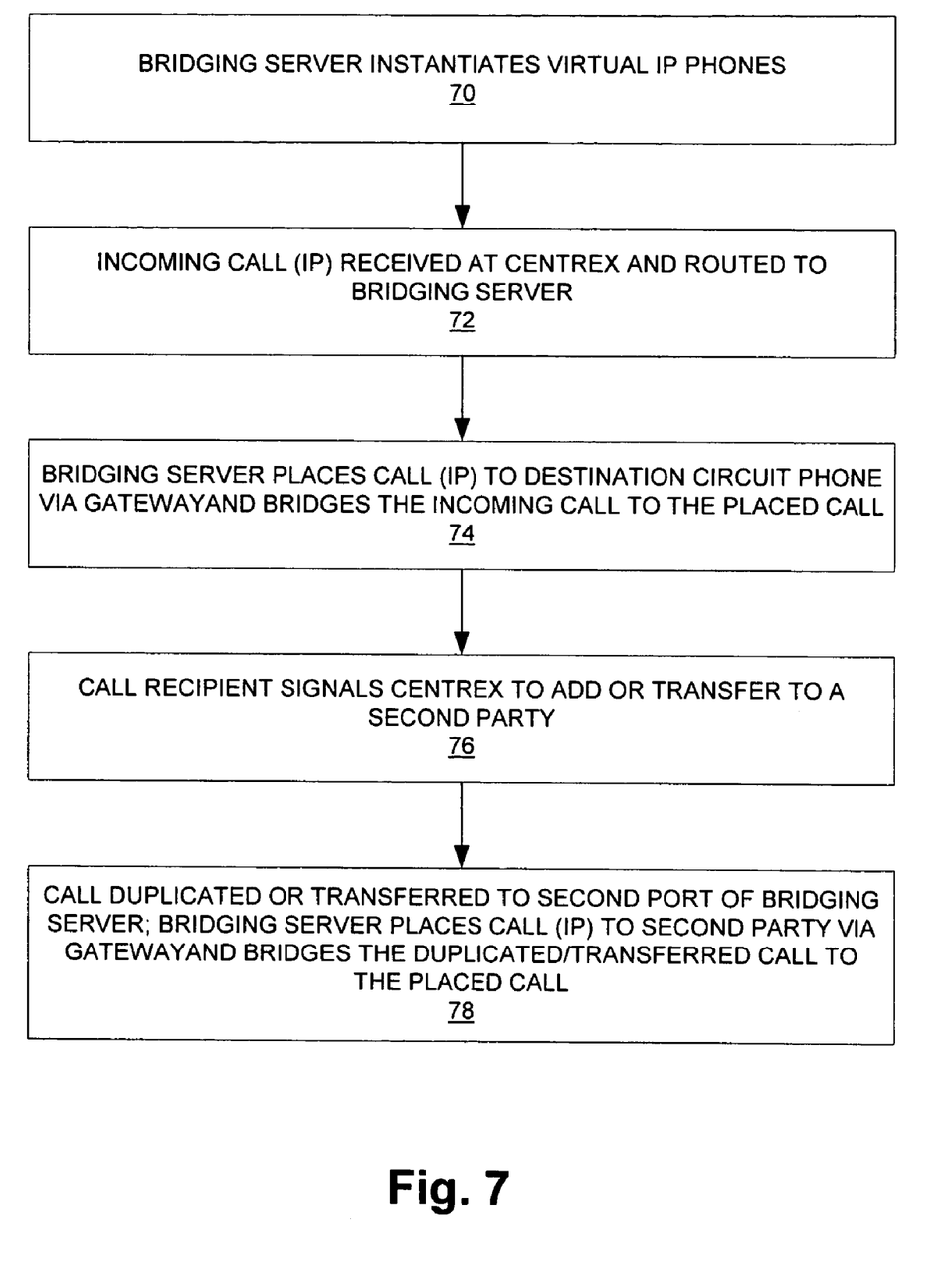
FIG. 7 is a flow diagram of the manner of operation of the CENTREX system of FIG. 6.

Referring to FIG. 7, as shown at step 70 the bridging server 36 at start-up instantiates a number of virtual IP telephones. Four such telephones 38-3 through 38-6 are shown in FIG. 8.

Figure 8:
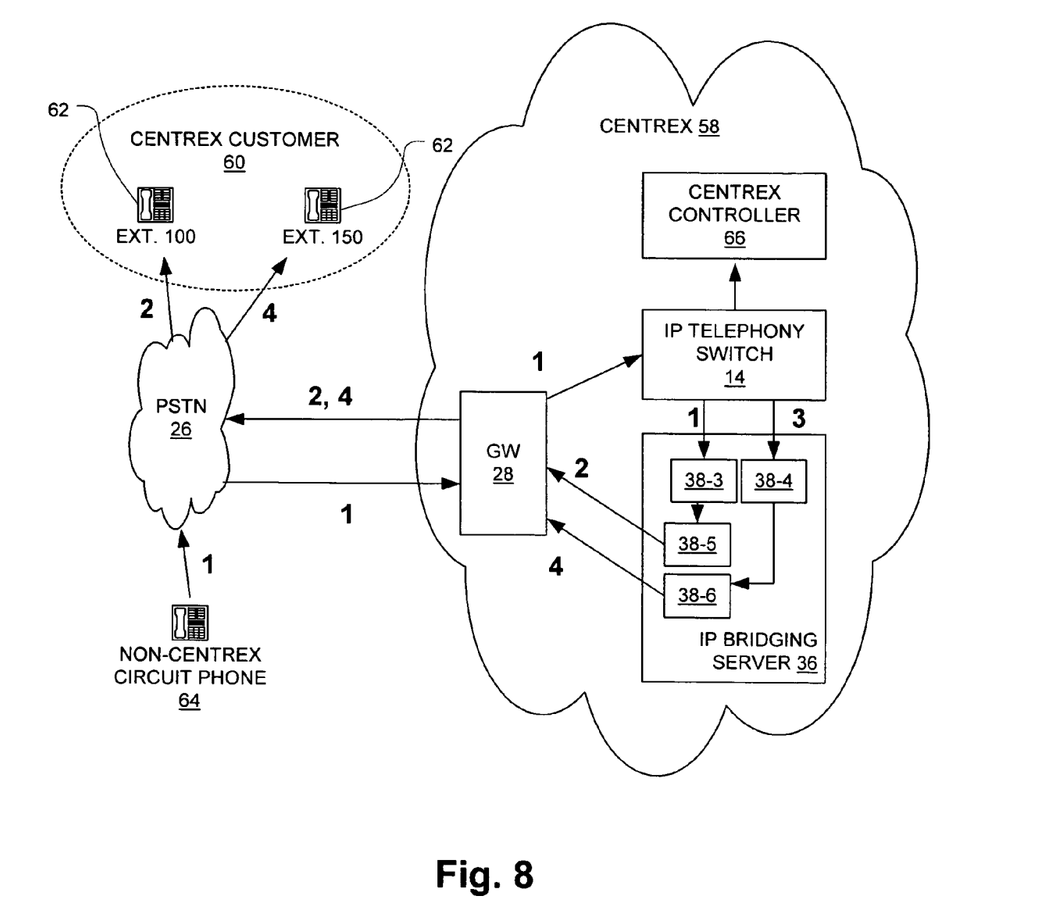
FIG. 8 is a block diagram of the CENTREX system of FIG. 6 with descriptive annotations corresponding to the steps of the process of FIG. 7.

As shown at step 72 and indicated as "1" in FIG. 8, a call is placed from the non-CENTREX circuit phone 64, and the call is converted by the gateway 28 into an IP telephony call. The CENTREX controller 66 provides controls to the IP telephony switch 14 to route the call to the IP bridging server 36, in particular to the virtual IP phone 38-3 which is associated with extension 100 of the CENTREX customer 60. In this respect, the virtual IP phone 38-3 is a proxy for the circuit phone at extension 100 in a manner similar to the proxy aspect of virtual IP phone 38-2 in FIG. 5.

As shown at step 74 of FIG. 7 and indicated as "2" in FIG. 8, the bridging server 36 then places an outgoing call, via virtual IP phone 38-5, to extension 100 via the gateway 28. Additionally, the IP bridging server bridges the two virtual IP phones 38-3 and 38-5 to complete the path for the call. At this point, the connection is established and the call progresses.

As shown at step 76 of FIG. 7, the called party (recipient) at some point generates a signal indicating that it desires to conference in another party, which may be done at the called party's phone by pressing a "conference" button for example and then dialing the extension (e.g., 150) of the other party. The gateway 28 translates this signaling into corresponding IP telephony signaling and forwards it to the CENTREX system 58. As indicated as "3" in FIG. 8, the CENTREX controller 64 instructs the IP telephony switch 14 to create a second call "leg" to the virtual IP phone 38-4 of the IP bridging server 36.

As shown at step 78 of FIG. 7 and indicated as "4" in FIG. 8, the IP bridging server responds to the incoming second call leg by placing an outgoing call, via virtual IP phone 38-6, to extension 150. Additionally, the IP bridging server bridges the two virtual IP phones 38-4 and 38-6 to complete this second call leg. At this point, the connection for the second party is established and the conference portion of the call progresses.

It will be appreciated that other CENTREX functions can be implemented by the CENTREX system 58 in an analogous fashion. For example, a call transfer follows a similar process, except that the original connection is terminated once the new connection to the second party is completed. If the original called party is at extension 100 as in the above example, then after the transfer the virtual IP phones 38-3 and 38-5, as well as the bridging connection therebetween, become inactive.

Those skilled in the art will appreciate that embodiments and variations of the present invention other than those explicitly disclosed herein are possible. It is to be understood that modifications to the methods and apparatus disclosed herein are possible while still achieving the objectives of the invention, and such modifications and variations are within the scope of this invention. Accordingly, the scope of the present invention is not to be limited by the foregoing description of embodiments of the invention, but rather only by the claims appearing below.

What is claimed is:

1. A method of routing a packet customer call to an agent employing a circuit telephone, comprising: establishing first and second virtual nodes on a bridging server; assigning unique identifiers to the first and second virtual nodes for addressing the first and second virtual nodes directly; associating the agent employing the circuit telephone with the unique identifier of the second virtual node; establishing, via a gateway device on the bridging server, an agent call between the first virtual node and the circuit telephone of the agent; receiving a customer call from a customer circuit phone via a gateway and a switch, wherein the customer call from the circuit telephone is converted to the packet customer call by the gateway; routing the packet customer call to the agent using the unique identifier of the second virtual node associated with the agent; and, bridging the first and second virtual nodes by establishing a connection between the first and second virtual nodes to provide for relaying telephony packets of the packet customer call and the agent call between the first and second virtual nodes; wherein the second virtual node acts as a proxy for the circuit telephone of the agent.

2. A method according to claim 1, wherein the agent call is established in advance of the customer call and persists beyond the termination of the customer call.

3. A method according to claim 1, wherein the agent call is established in response to the receipt of the customer call at the second virtual node.

4. A method according to claim 1, further comprising: modifying initial packets of the customer call to insert a notification of the customer call to the agent.

5. A method according to claim 4, wherein the notification comprises a characteristic tone.

6. A method according to claim 4, wherein the notification comprises information identifying the customer to the agent.

7. A method according to claim 1, wherein the agent logs in to the second virtual node to indicate the agent's availability to receive customer calls.

8. A method according to claim 7, wherein the agent logs in via a terminal device coupled to a data network to which the second virtual node is also coupled.

9. A method according to claim 7, wherein the agent logs in via the circuit telephone.

10. A call center for routing a packet customer call to an agent employing a circuit telephone, comprising: a packet switch having a plurality of interfaces, the packet switch being operative (1) to receive the packet customer call at a first interface via a gateway that converts a customer circuit telephone call to the packet customer call, and (2) in response to control inputs, to route the packet customer call from the first interface to one of a plurality of second interfaces; a call center controller operative in response to the packet customer call to establish the control inputs to the packet switch such that the packet customer call is routed to a selected one of the plurality of second interfaces, the selected one of the plurality of second interfaces being associated within the call controller with the agent employing the circuit telephone; and a packet bridging server including a plurality of virtual nodes, a first virtual node having a first unique identifier by which the first virtual node can be addressed directly and coupled to a packet interface of a gateway device via which the agent can be reached, a second virtual node having a second unique identifier by which the second virtual node can be addressed directly, the second virtual node is associated with the agent employing the circuit telephone, and the second virtual node coupled with a second selected one of the plurality of second interfaces of the packet switch, the packet bridging server being operative (1) to establish a first connection via the gateway device between the first virtual node and the circuit telephone of the agent, (2) to establish a bridging connection between the second virtual node and the first virtual node, and (3) to relay packets of the packet customer call between the first and second virtual nodes using the bridging connection; wherein the second virtual node acts relative to the packet switch and the call center controller as a proxy for the circuit telephone of the agent employing the circuit telephone.

11. A call center according to claim 10, wherein the packet bridging server is operative to establish the first connection in advance of the customer call and to maintain the first connection beyond the termination of the customer call.

12. A call center according to claim 10, wherein the packet bridging server is operative to establish the first connection in response to the receipt of the customer call at the second virtual node.

13. A call center according to claim 10, wherein the bridging server includes a media modification element operative to modify initial packets of the customer call to insert a notification of the customer call to the agent.

14. A call center according to claim 13, wherein the notification comprises a characteristic tone.

15. A call center according to claim 13, wherein the notification comprises information identifying the customer to the agent.

16. A call center according to claim 10, wherein the call center controller is coupled to a virtual private network by which the agent logs in to the second virtual node to indicate the agent's availability to receive customer calls.

17. A call center according to claim 10, wherein the bridging server is operative to accept an agent log-in via the circuit telephone.

18. A method of providing centralized private exchange (CENTREX) service to a plurality of circuit telephones, comprising: establishing a plurality of pairs of virtual packet nodes on a bridging server, each pair of virtual packet nodes being associated with a corresponding one of the circuit telephones of the plurality of circuit telephones, each pair of virtual packet nodes including (1) a first virtual node operative to form a connection, via a gateway device, with a corresponding circuit telephone of the plurality of circuit telephones, and (2) a second virtual node operative to receive incoming packet telephone calls destined for the corresponding circuit telephone of the plurality of circuit telephones; assigning unique identifiers to the pairs of virtual packet nodes for addressing the first and second virtual nodes directly; associating a first circuit telephone of the plurality of circuit telephones with a unique identifier of a second virtual packet node belonging to a selected pair of virtual packet nodes selected from the plurality of pairs of virtual packet nodes and in response to the receipt of an incoming circuit telephone call destined for the first circuit telephone via a gateway that converts the circuit telephone call to a packet telephone call destined for the first circuit telephone of the plurality of circuit telephones, routing the incoming packet telephone call to the first circuit telephone using the unique identifier of the second virtual packet node associated with the first telephone circuit, the incoming packet telephone call being received at the second virtual node associated with the first circuit telephone, (1) establishing, via the gateway device, a connection between the first circuit telephone and the associated first virtual node belonging to a selected pair of virtual packet nodes, (2) establishing a connection between the first and second virtual nodes associated with the first circuit telephone, and (3) relaying telephony packets of the incoming packet telephone call between the first and second virtual packet nodes; wherein the second virtual node acts as a proxy for the first circuit telephone of the plurality of circuit telephones.

19. A centralized private exchange (CENTREX) system operative to provide CENTREX service to a plurality of circuit telephones, comprising: a packet switch having a plurality of interfaces, the packet switch being operative (1) to receive incoming packet telephone calls at a first interface, and (2) in response to control inputs to route the incoming packet telephone calls from the first interface to one of a plurality of second interfaces; a CENTREX controller operative in response to an incoming circuit telephone call via a gateway that converts the circuit telephone call to a packet telephone call destined for a selected one of the plurality of circuit telephones to establish the control inputs to the packet switch such that the incoming packet telephone call is routed to a selected first one of the plurality of second interfaces, the first selected one of the plurality of second interface interfaces being associated within the CENTREX controller with the one of the plurality of circuit telephones; and a packet bridging server including a plurality of virtual nodes, a first virtual node having a first unique identifier by which the first virtual node can be addressed directly and being coupled to a packet interface of a gateway device via which the selected one circuit telephone can be reached, a second virtual node having a second unique identifier by which the second virtual node can be addressed directly, being associated with the selected one of the circuit telephones, and being coupled with the first selected one of the plurality of second interfaces of the packet switch, the packet bridging server being operative in response to the incoming call (1) to establish a first connection via the gateway device between the first virtual node and the selected one circuit telephone, (2) to establish a bridging connection between the second virtual node and the first virtual packet telephone, and (3) to relay packets of the incoming packet telephone call between the first and second virtual nodes using the bridging connection; wherein the second virtual node acts relative to the packet switch and the CENTREX controller as a proxy for the selected one circuit telephone of the plurality of circuit telephones.

20. The method of claim 1, wherein the first and second virtual nodes are established on the bridging server during initial operation of the bridging server.

21. A method according to claim 1, wherein:
the assigning includes assigning a first unique IP address identifier to the first virtual node, and assigning a second unique IP address identifier to the second virtual node;
the associating includes associating the agent employing the circuit telephone with the second unique IP address identifier; and,
the routing includes routing the packet customer call directed to the agent using the second unique IP address identifier associated with the agent.

22. A method according to claim 1, wherein:
the assigning includes assigning an IP address identifier to the first and second virtual nodes, assigning a first port number identifier to the first virtual node for use together with the IP address identifier to address the first virtual node directly, and assigning a second port number identifier to the second virtual node for use together with the IP address identifier to address the second virtual node directly;
the associating includes associating the agent employing the circuit telephone with the second port number identifier; and,
the routing includes routing the packet customer call directed to the agent using the IP address identifier and the second port number identifier associated with the agent.

\* \* \* \* \*